Sept. 11, 1934.  C. B. JOLLIFFE  1,973,532
METHOD OF AND APPARATUS FOR HATCHING EGGS
Filed July 20, 1927
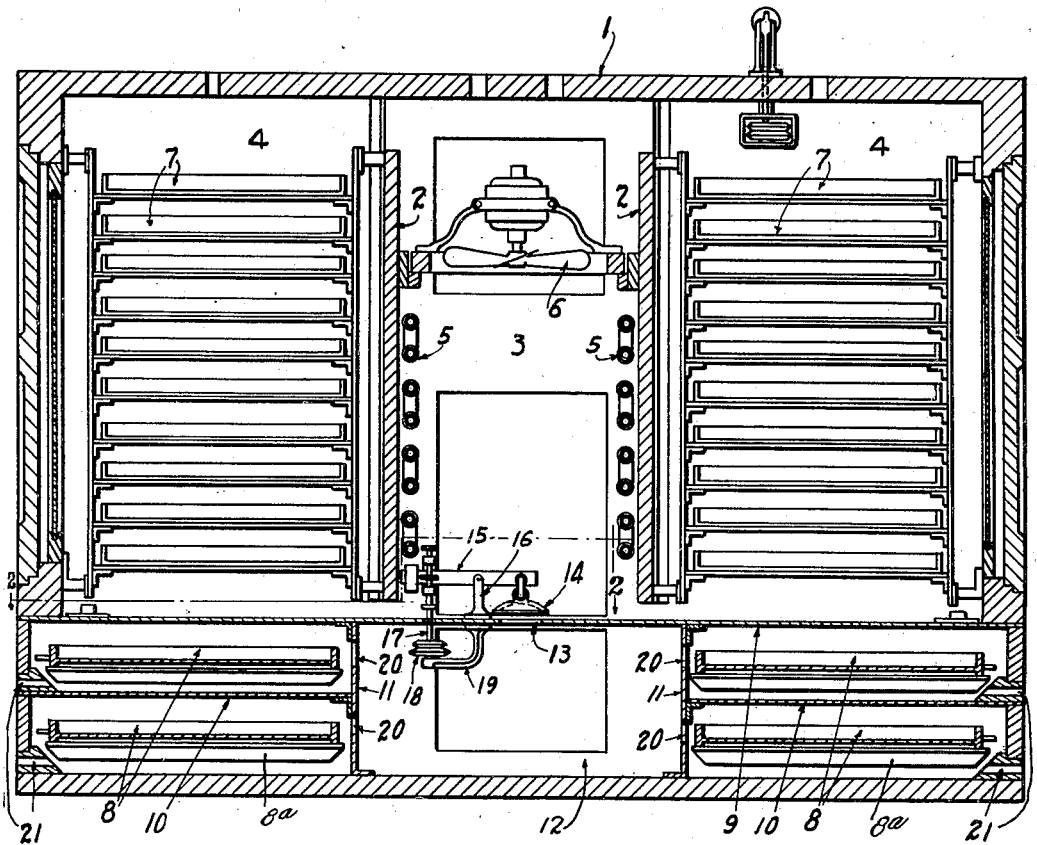
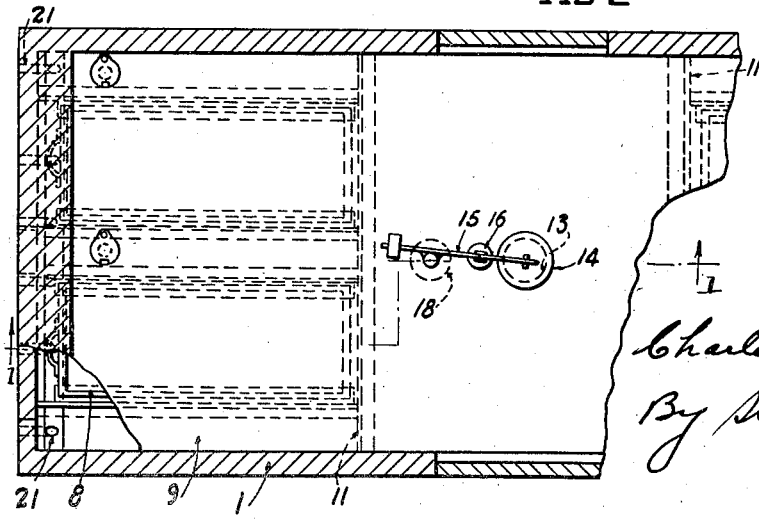
Inventor
Charles B. Jolliffe
By Staley & McLeh
Attorney Patented Sept. 11, 1934

1,973,532

UNITED STATES PATENT OFFICE 1,973,532

METHOD OF AND APPARATUS FOR HATCHING EGGS

Charles B. Jolliffe, Springfield, Ohio, assignor, by mesne assignments, to The Buckeye Incubator Manufacturing Company, Beachwood, Ohio, a corporation of Ohio Application July 20, 1927, Serial No. 207,240

11 Claims. (Cl. 119—35)

This invention relates to a method of and apparatus for the incubation of eggs, it more particularly relating to an arrangement for supplying heated air from a common source at different temperatures to the various stages of the eggs.

In incubators of large capacity in which the eggs are arranged in different stages of incubation, with provision for supplying heated air thereto, it is essential for best results that the temperature of the air should vary for the different stages. This is particularly true in connection with the eggs in the last stage of incubation or in the process of hatching, which require air at a temperature several degrees lower than that supplied to eggs in a less advanced stage.

To maintain the eggs at the required temperature in accordance with my invention the eggs of different stages of incubation are arranged in separate compartments, and as the air is supplied from a common source, it is the object of my invention to provide simple and effective means for cooling a part of the heated air received from the heating chamber or other source to the degree best suited to the particular stage of incubation of the eggs to which it is supplied.

A further and more specific object of the invention is to provide a cooling means for the air in the nature of a cooling chamber interposed between the source of heated air and the eggs in the hatching chamber to cool the air received from the source of supply to a degree best suited for the eggs of that particular stage.

Another object of the invention is to provide means for regulating the amount of air supplied to the cooling chamber which means may be of a fixed character or of an adjustable character and in some cases automatically adjusted by a thermostat.

Another object of the invention is to provide, in an incubator in which the eggs in the process of hatching are separated from the eggs in the other stages of incubation and in which air is supplied to all of the eggs from a common source, simple and effective means for reducing the temperature of the air supplied to the eggs in the process of hatching.

In the accompanying drawing:

Fig. 1 is a vertical section of an apparatus which I employ in carrying out my improved method taken on the line 1—1 of Figure 2.

Fig. 2 is a section on the line 2—2 of Fig. 1.

In the present example of an apparatus for carrying out my method, I have shown in one group eggs in one stage of incubation separated in another group from eggs in other stages of incubation, the separated eggs being those in the last stage or process of hatching, but it is to be understood that my invention contemplates also the separation of the eggs of any or all of the other stages.

Referring to the drawing, 1 represents the outer casing which is divided by longitudinal partitions 2 into three compartments, a central heating compartment 3 and two side egg tray compartments 4; the egg tray compartments being respectively in communication with the heating chamber at their upper and lower ends. The heating chamber has hot water heating coils 5 arranged at its sides in the usual way and there is also provided an electric fan 6 for causing a circulation of the heated air downwardly through the heating chamber and upwardly through the trays 7 within the egg compartments 4; these trays in the present case containing the eggs in all of the stages of incubation except the last or hatching stage.

The hatching trays are indicated at 8 and each tray is in the present case preferably located in a separate compartment formed by horizontal walls 9 and 10, inner vertical walls 11 and the main wall of the incubator 1 and supported by suitably supported ledges 8a; one of the purposes of so separating the hatching trays from each other as well as from the other trays being to prevent the dissemination of disease germs from diseased chicks as well as scattering of the down, although this separate arrangement of the hatching trays has no particular bearing on my invention, broadly considered. The hatching compartments are located at each side of the main casing 1 so as to form between them a cooling chamber 12, the upper portion of which is closed by the horizontal walls 9 save for a restricted opening 13 which forms a communication between the cooling chamber and the heating chamber. This opening 13 is in the present case controlled by a valve or damper 14 which is suspended on a lever 15 fulcrumed on a bracket 16 supported by the horizontal wall 9 and having a connection through a link 17 with a thermostat 18 of a well known type which is located in the cooling chamber and supported on the depending bracket 19; suitable provision being made in the usual way for counterbalancing the damper and adjusting the thermostat. The cooling chamber also has a communication through the openings 20 in the inner walls 11 with each of the hatching compartments, the outer end of each of the hatching compartments having an outlet leading to outside atmosphere as indicated at 21.

In operation, the air which enters the cooling chamber from the heating chamber is cooled to a degree to maintain a proper temperature in the hatching tray compartments, the degree of temperature being maintained several degrees below that of the heating chamber. The regulation of the temperature is effected by admitting more or less air through the opening 13 by proper thermostatic adjustment of the valve 14, the thermostat being responsive to the temperature of the cooling chamber, or in any other suitable way.

Having thus described my invention, I claim:

1. In an apparatus for incubating eggs, a main compartment for eggs in process of incubation, means for heating said compartment, a series of separated compartments for the eggs in the process of hatching, and a common cooling chamber having openings in communication with said hatching compartments through which a portion only of the air passes to said hatching compartments from said main compartment, there being a restricted opening forming a communication between said main compartment and said cooling compartment.

2. In an apparatus for incubating eggs, a main compartment for eggs in process of incubation, means for heating said compartment, a series of separated compartments for the eggs in the process of hatching, a common cooling chamber in communication with said hatching compartments, there being a restricted opening forming a communication between said main compartment and said cooling compartment, and means for thermostatically controlling said opening by the temperature of said cooling compartment.

3. In an apparatus for incubating eggs, a main compartment for eggs in process of incubation, means for heating the air in said compartment, two series of separated compartments for the eggs in the process of hatching, and a common cooling chamber arranged between said series of hatching compartments and communicating therewith, said cooling chamber also having a restricted communication with said main compartment.

4. In an apparatus for incubating eggs, a main compartment for eggs in process of incubation, means for heating the air in said compartment, two series of separated compartments for the eggs in the process of hatching, a common cooling chamber arranged between said series of hatching compartments and communicating therewith, said cooling chamber also having a restricted communication with said main compartment, and thermostatic means responsive to the temperature of said cooling chamber for controlling said restricted communication.

5. In an apparatus for incubating eggs, a main compartment for the eggs in process of incubation, a separate compartment for the eggs in the process of hatching, means for supplying heated air from a common source to all of said eggs, a cooling chamber interposed between the two compartments having a communication with the hatching compartment and also a communication with the main compartment, whereby a part only of the air is taken from the main compartment cooled and supplied to the hatching compartment and thermostatic means for regulating the amount of air supplied to said cooling compartment.

6. In an incubator, a casing having a transverse wall with a hole therein dividing the casing into two sections, means to divide one section into incubating compartments with a heating compartment between the incubating compartments, means to divide the other section into hatching compartments with a cooling chamber between the hatching compartments, and means operated by the temperature of the cooling chamber to close the hole and regulate the passing of warm air from the heating compartment into the cooling chamber.

7. In an incubator, a casing having a transverse wall with a hole therein dividing the casing into two sections, means to divide one section into incubating compartments with a heating compartment between the incubating compartments, means to divide the other section into hatching compartments with a cooling chamber between the hatching compartments, and means operated by the temperature of the cooling chamber to close the hole and regulate the passing of warm air from the heating compartment into the cooling chamber, each of said hatching compartments having a passageway for the passage of air from the cooling compartment to the outside of the casing.

8. In an incubator, a casing having therein an incubating compartment and a hatching compartment having a passageway therethrough from the incubating compartment, a common means for agitating the air in the incubating compartment and driving the air through the hatching compartment to a point without the casing, and means operated by the temperature of the air driven through the hatching compartment to regulate the passing of the air through the hatching compartment.

9. In an incubator, a casing having a heating compartment, a cooling chamber communicating with the heating compartment by an opening, a hatching compartment on each of opposite sides of the cooling chamber with a passageway therethrough from the cooling chamber to the outside of the casing, and means operated by the temperature of the air in the cooling chamber to close the opening.

10. The method of hatching eggs which consists in placing incubating eggs in one group and hatching eggs in another group, heating air, moving the heated air about the incubating eggs, withdrawing only a part of the moving air and cooling it, and passing the cooled air in a stream over the hatching eggs.

11. In an apparatus for incubating eggs, a pair of compartments, an intervening cooling chamber between said compartments connected to each compartment by an air passageway, means for supplying heat to one of said compartments, means in said one compartment for moving the air therein and causing a part thereof to pass into said cooling chamber and through the cooling chamber to the other compartment where it is discharged into the outside atmosphere.

CHARLES B. JOLLIFFE.